US005920538A

United States Patent [19]
Il'Yashenko

[11] Patent Number: 5,920,538
[45] Date of Patent: Jul. 6, 1999

[54] MAGNETO-OPTICAL READOUT METHOD AND MAGNETO-OPTICAL READOUT HEAD AND METHOD FOR MAKING SAME

[75] Inventor: Eugene Il'Yashenko, Moscow, Russian Federation

[73] Assignee: Tandberg Data ASA, Oslo, Norway

[21] Appl. No.: 09/096,257

[22] Filed: Jun. 11, 1998

[51] Int. Cl.⁶ ..................................................... G11B 7/00
[52] U.S. Cl. ............................. 369/112; 369/13; 369/110
[58] Field of Search ............................... 369/13, 112, 110

[56] References Cited

U.S. PATENT DOCUMENTS

| | | | |
|---|---|---|---|
| 4,275,428 | 6/1981 | Lehureau | 360/121 |
| 4,897,747 | 1/1990 | Meunier et al. | 360/122 |
| 5,050,027 | 9/1991 | Meunier et al. | 360/122 |
| 5,093,980 | 3/1992 | Maurice et al. | 360/122 |
| 5,123,156 | 6/1992 | Meunier et al. | 360/121 |
| 5,157,641 | 10/1992 | Lehureau | 369/13 |
| 5,167,062 | 12/1992 | Castera et al. | 360/119 |
| 5,189,579 | 2/1993 | Colineau | 360/121 |
| 5,227,938 | 7/1993 | Colineau et al. | 360/114 |
| 5,235,570 | 8/1993 | Kurtz et al. | 369/13 |
| 5,282,104 | 1/1994 | Coutellier et al. | 360/115 |
| 5,309,422 | 5/1994 | Kuroki et al. | 369/110 |
| 5,365,391 | 11/1994 | Sugiyama et al. | 360/110 |

OTHER PUBLICATIONS

"A Method for Observation and Measurement of the Velocity of Bubble Propagation in Thin Ferrogarnet Films," Il'Yashenko et al., Physica Status Solidi, vol. 36 (1976), pp. K1–K6.

"Integrated Magnetic Recording Heads," Lazzari et al., IEEE Trans. on Mag., vol. MAG–7, No. 1, Mar. 1971, pp. 146–150.

"Magnetic Instability of Thin–Film Recording," Klaassen et al., IEEE Trans. on Mag., vol. 30, No. 2, Mar., 1994, pp. 375–379.

"The Complete Handbook of Magnetic Recording," 4th Ed. Jorgensen, pp. 193 and 238–262 (1995).

"Giant Magnetoresistance Materials and Their Potential As Read Head Sensors," White, IEEE Trans. on Mag., vol. 30, No. 2, Mar. 1994, pp. 346–352.

GMR Multilayers and Head Design for Ultrahigh Density Magnetic Recording, Smith et al., IEEE Trans. on Mag. vol. 32, No. 1, Jan., 1996, pp. 135–141.

"Towards the Multitrack Digital Video Tape Recorder," Maurice, Proceedings of Magneto–Optical Recording International Symposium '91, J. Magn. Soc. Jpn., vol. 15, Supp. No. S1 (1991) pp. 389–394.

"The Kerr Head: A Multitrack Fixed Active Head," Maillot et al., IEEE Trans. on Mag., vol. 28, No. 5, Sep., 1992, pp. 2656–2658.

Longitudinal Kerr Effect Enhancement of a 384 Track Head for High Data Rate Readout, LeTexier et al., J. Appl. Phys. 73 (10), May 15, 1993, pp. 6238–6240.

*Primary Examiner*—John W. Cabeca
*Assistant Examiner*—Kim Chu
*Attorney, Agent, or Firm*—Hill & Simpson

[57] ABSTRACT

A magneto-optical readout head for reading out magnetically stored data has a high optical quality substrate and a transducer applied to the substrate formed by a Faraday rotator and a Kerr rotator, with the Kerr rotator facing the magnetic storage medium. The substrate can be provided with a shape for magnifying the domain structures of the Kerr rotator and the Faraday rotator. Linearly polarized light is passed through the substrate and the polarization vector thereof is rotated by the Faraday rotator upon passage through the Faraday rotator and the light is reflected at the Kerr rotator, and is provided with an additional rotation upon reflection. Upon passing back through the Faraday rotator, the polarization vector of the polarized light is further rotated, so that the emerging light has a polarization vector which has been rotated by twice the Faraday coefficient of the Faraday rotator times the thickness of the Faraday rotator, plus the Kerr rotation coefficient of the Kerr rotator positively added thereto. The light emerging from the magneto-optical readout head is analyzed as to the amount of rotation of the polarization vector, thereby identifying the readout data. Because the amount of rotation of the polarization vector is enhanced by the Faraday rotator in combination with the Kerr rotator, magneto-optical readout of the real-time magnetic field pattern associated with high frequency and ultra high density recording is reliably achieved.

41 Claims, 2 Drawing Sheets

MAGNETO-OPTICAL READOUT METHOD AND MAGNETO-OPTICAL READOUT HEAD AND METHOD FOR MAKING SAME

BACKGROUND OF THE INVENTION

1. Field of the Invention

The present invention is directed to a method for magneto-optical readout of data stored in a magnetic storage medium, as well as to a magneto-optical readout head for effecting such readout, and to a method for making such a magneto-optical readout head.

2. Description of the Prior Art

Data can be magnetically stored in a variety of magnetic media, such as tapes and discs of the type for computer data storage, and video and audio discs and tapes for the storage of entertainment data.

A number of technologies are available for constructing a readout head for retrieving the magnetically stored data from such media. One known technology is that of inductive thin film heads. The inductive thin film head is the basic component in the playback of recorded signals of all types. A head of this type has a magnetic thin film core which senses the changing magnetic flux from a recorded tape or disc. The type of core used in inductive thin film heads currently being widely manufactured is formed of a flux-conducting magnetic material with a very high permeability, the core being provided with a winding and having a small gap therein. The gap collects or senses the available flux from the recorded track, and the core interacts with the winding so that a voltage, corresponding to the recorded data, is produced across the ends of the winding. Inductive thin film heads of this type are described, for example, in Integrated Magnetic Recording Heads, Lazzari et al, IEEE Trans. Magn., Vol. MAG7(1), March, 1971, pages 146–150; Magnetic Instability Of Thin Film Recording Heads, IEEE Trans. Magn., Vol. MAG30(2), March 1994, pages 375–380; and The Complete Handbook Of Magnetic Recording, 4th Ed., Jorgensen et al, TAB Books, 1995, pages 238–262.

A problem with conventional inductive thin film heads is that it is very difficult to increase the information density handled by such heads, because the distance between the poles of such a head is finite, and cannot be completely eliminated without destroying the intended operation of the head. Moreover, a gap interface between the gap surfaces and the ambient environment results in a signal loss, usually referred to as spacing loss. Although great strides have been taken towards miniaturization of such heads, practical constraints impose the necessity of a very precise mechanical design and exacting manufacturing techniques for ultra-high density storage. Thin film inductive heads also exhibit a poorer carrier-to-noise ratio (CNR) then other head technologies. Moreover, the existing state of the technology relating to thin film inductive heads makes it difficult to manufacture multi-track heads which can simultaneously read information from a number of parallel recording tracks without mistracking.

Another known head technology is the so-called giant magneto-resistive (GMR) head. This type of head is manufactured from a magneto-resistive material which makes use of phenomena which occur when thin magnetic layers (1–3 nm) of transition metals (Fe, Co, Ni) are separated by ultra thin (a few angstroms) of non-magnetic metal (Cr, Cu, Ag, Au). Giant magneto-resistive heads are described, for example, in "Giant Magneto-Resistance Materials And Their Potential As Readhead Sensors," White, Trans. Magn., Vol. MAG-30(2), March 1994, pages 346–352; "GMR Multi-Layers And Head Design For Ultra-High Density Magnetic Recording," Parker et al., TMRC'95, IEEE Trans. Magn., Vol. 32, pages 135–141; and "The Complete Handbook Of Magnetic Recording, 4th Ed., Jorgensen, TAB Books, 1995, page 193.

The production of readout heads according to GMR technology requires ultra-precise (nanometric) manufacturing techniques which results in a small production yield, thereby effecting the economic viability of this approach. Furthermore, the subnanometric nature of the fabrication makes it very difficult to maintain consistent parameters from one head cell to another in multi-track assemblies. The sensitivity coefficient (resistance per unit of external field, $\Delta\rho=\Delta\Omega/H_{ex}$) requires very precise thickness control, with tolerances of typically ±3 to 4 Å. GMR heads also exhibit a problem associated with inter-diffusion between the ultra-thin non-magnetic conductor layer (usually a few angstroms) and the adjacent magnetic layers. Another problem associated with GMR heads (which also exists with thin film inductive heads) is that an Eddy-current limitation occurs at higher data rates, which limits the data handling rate of such heads.

A magneto-optical recording and playback technology has been developed by Thomson-CSF, among others. This technology employs a matrix magnetic head to write multiple tracks (100 to 1000 tracks) in parallel. Readout takes place using a magneto-optical head employing the Kerr magneto-optical effect (hereinafter referred to simply as the Kerr effect). The Kerr effect is a known phenomenon whereby changes in the optical properties of a reflecting surface of a ferromagnetic substance are produced when the substance is magnetized. This phenomenon applies particularly to the elliptical polarization of reflected light, when the ordinary rules of metallic reflection would produce only plane polarized light. In this type of head technology, the tape is read with a wide magnetic head which reads all of the tracks in parallel. The magnetic field picked up with the head is used to modulate polarized light, using the Kerr effect, which changes the polarization angle of the light. A light beam is directed through a fixed polarizer onto a CCD line detector, with one pixel for each track. An advantage of this technology is that many tracks can be recorded and read in parallel at the same time, without guard bands between the tracks. A disadvantage associated with this technology is that thus far the Kerr element in the read head has proven to have performance limitations associated therewith.

Heads of the above type employing the Kerr effect are described, for example, in "Toward The Multi-Track Digital Video Tape Recorder," Maurice, MORIS 91, J. Magn. Soc. Jpn., Vol. 15, Supp. No. S1, 1991, pages 389–394; "The Kerr Head: A Multi-Track Fixed Active Head," Maillot et al, Intermag '92, IEEE Trans. Magn., Vol. 28, No. 5, September 1992; "Longitudinal Kerr Effect Enhancement Of A 384 Track Head For High Data Rate Readout," Le Texier et al, MMM Conf. '93, Houston Tex.; and U.S. Pat. Nos. 5,282,104; 5,227,938; 5,189,579; 5,167,062; 5,157,641; 5,123,156; 5,093,980; 5,050,027; 4,897,747 and 4,275,428, all assigned to Thomson CSF; and U.S. Pat. No. 5,365,391 assigned to Sony Corp.

The known magneto-optical head developed by Thomson CSF in accordance with the above references has the disadvantage of a small CNR.

Given a magnetic field of a strength typical in this technology, the rotation angle in the polarization plane is small in the Thomson CSF head, typically only approximately 0.35° at 633 nm. The Thomson CSF head also exhibits cross-talk between adjacent tracks of a head of multi-track design, as a result of the necessity of employing a sensitive surface which is not mono-crystalline. Control of the magnetic properties of the very thin Sendust® (FeAlSi) gap layer remains a significant problem with regard to manufacturing consistency. Additionally, the optical properties of this Sendust® are complex, and contribute to the difficulty of optimizing the optical path. The optical path in the Thomson CSF head is therefore far from ideal, both from the point of view of optical efficiency and the point of view of optimizing the sensitivity to signal detection. Lastly, magnetic noise, resulting from the Barkhausen effect, contributes to a reduction of the CNR at larger illuminated areas.

Another magneto-optical head has been proposed by Garnetec. This head uses the Faraday effect. The Faraday effect is a known phenomenon whereby the polarization of a beam of linearly polarized light is rotated when the light passes through a substance in the direction of an applied magnetic field. This effect results from Faraday birefringence, which is the difference in the indices of refraction of left and right circularly polarized light passing through a substance parallel to an applied magnetic field. In the head proposed by Garnetec, the Faraday effect is produced by a transparent magnetic thin film with initial in-plane magnetization, which functions as a Faraday rotator. The polarization rotation produced by the Faraday effect is more pronounced than that produced by the longitudinal Kerr effect. The head proposed by Garnetec has a side which faces away from the magnetic storage medium which has a curved shape (convexity) which acts to magnify the image of the domain structure of the transparent Faraday effect film. The use of such a magnifier improves resolution considerably, if the magnifier material has a high refractive index.

The head proposed by Garnetec is described in co-pending U.S. patent application Ser. No. 08/842,286 filed on Apr. 23, 1997 ("Magneto-Optical Head For Information Reading," assigned to Garnetec), and a discussion of related physics is found in "Method For Observation And Measurement Of The Velocity Of Bubble Propagation In Thin Ferrogarnet Films," Il'Yashenko, Physica Status Solidi, Vol. 36, 1976, pages K1–K6.

Garnetec has also proposed a multi-track readout head wherein the Faraday effect is used twice, but becomes smaller at ultra high density recording. This is because at very high optical resolution, with a transition length of only 0.1 μm at a wavelength of 630 nm, it is necessary to decrease the thickness t of the magneto-optically active thin film (usually bi-substituted ferrite-garnet film) in order to increase the optical resolution. In this case, the total Faraday resolution $\Psi_F$ is also decreased, because $\Psi_F = 2\theta_F \cdot t$, where $\theta_F$ is the Faraday rotation coefficient. For transition lengths of 0.15 μm and less, a magneto-optical thin film of not more than 0.2 μm would be required. The total Faraday rotation $\theta_F$ for the best magneto-optically active films are less than 1° at a wavelength of 633 nm. Moreover, the polarizing resolution of the head is decreased, and consequently CNR is decreased.

SUMMARY OF THE INVENTION

It is an object of the present invention to provide a method for magneto-optically reading data from a magnetic storage medium with ultra high resolution. It is a further object of the present invention to provide a magneto-optical multi track head for reading data with ultra high resolution, which does not exhibit the aforementioned disadvantages of known magneto-optical recording heads, as well as to provide a method for manufacturing such a magneto-optical head.

It is a further object of the present invention to provide a method for manufacturing a magneto-optical multi track head which has a simple design and structure which does not require sub-nanometric fabrication techniques, and which allows a magneto-optical readout head to be produced having a homogenous structure.

A further object of the present invention is to provide a magneto-optical readout head having an intrinsically hard sensing layer which does not require a protective layer, and which is durable without adding increased complexity to the structure or manufacturing process.

Another object of the present invention is to provide a magneto-optical multi track readout head with improved CMR by exploiting the Faraday effect and the Kerr effect so as to produce a total polarization rotation which is larger than the rotation produced by known devices under similar conditions.

The above objects are achieved in a magneto-optical readout head, and method for manufacturing same, wherein a substrate of high optical quality, such as monocrystalline material, has a transparent thin film of magneto-optical material applied thereto which functions as a Faraday rotator. The layer functioning as a Faraday rotator has a layer of reflective material applied thereto functioning as a Kerr rotator, this latter layer forming the sensing surface of the readout head which faces the magnetic storage medium containing the data which is to be readout. The substrate, which is disposed on the opposite side of the layer functioning as a Faraday rotator, is given a shape which acts to magnify the image of the domain structures of the transparent Faraday effect film and the reflective Kerr effect layer, thereby providing the readout head with magneto-optical properties responsive to magnetic fields from the magnetic storage medium, and enabling optical readout of the real-time magnetic field pattern associated with high frequency and ultra high density recording. The magneto-optical material forming the layer functioning as a Faraday rotator may be, for example, a ferrite-garnet film.

In a readout method employing a head manufactured as described above, linearly polarized light illuminates and is directed through the substrate and through the Faraday rotator layer applied thereto. The Faraday rotator layer, being optically transparent, allows the light to pass therethrough onto the Kerr rotator layer, from which the light is reflected back through the Faraday rotator layer and again through the substrate. The light which emerges from the substrate therefore exhibits a polarization rotation of $2\theta_F \cdot t + \theta_K$, where $\theta_F$ is the Faraday rotation coefficient, t is the thickness of the Faraday effect layer, and $\theta_K$ is the Kerr rotation coefficient. Because both of the rotation coefficients are dependent on the applied magnetic field existing in the respective layers, they are influenced by the magnetically stored data in the magnetic storage medium which is proximate the Kerr effect layer. The total polarization rotation, therefore, is dependent on the magnetic flux produced by the stored data and the light emerging from the head is incident on a light detector which detects the amount of polarization rotation, and thus reads out the magnetically stored information. In order for $\theta_K$ to increase the total polarization, and thus achieve the aforementioned increased resolution, the wavelength of the illuminating light must be such that $\theta_K$ and $\theta_F$ have the same operational sign, so that $\theta_K$ increases, (positively adds to) the product $2\theta_F \cdot t$, rather than cancelling (negatively adds to) all or a portion thereof.

Given the aforementioned design of the magneto-optical head, a polarization rotation at a wavelength of 633 nm of approximately 4° is achieved, compared with the aforementioned rotation of approximately 0.35° under similar conditions in the Thomson CSF head of this type. Because the amount of polarization rotation is significantly enhanced in the head constructed and operating in accordance with the invention, transition regions in the magnetic storage medium can be much more reliably and rapidly detected, thereby making the magneto-optical readout head of the invention ideally suited for readout of ultra high density magnetically stored data.

DESCRIPTION OF THE PREFERRED EMBODIMENTS

Figure 1:
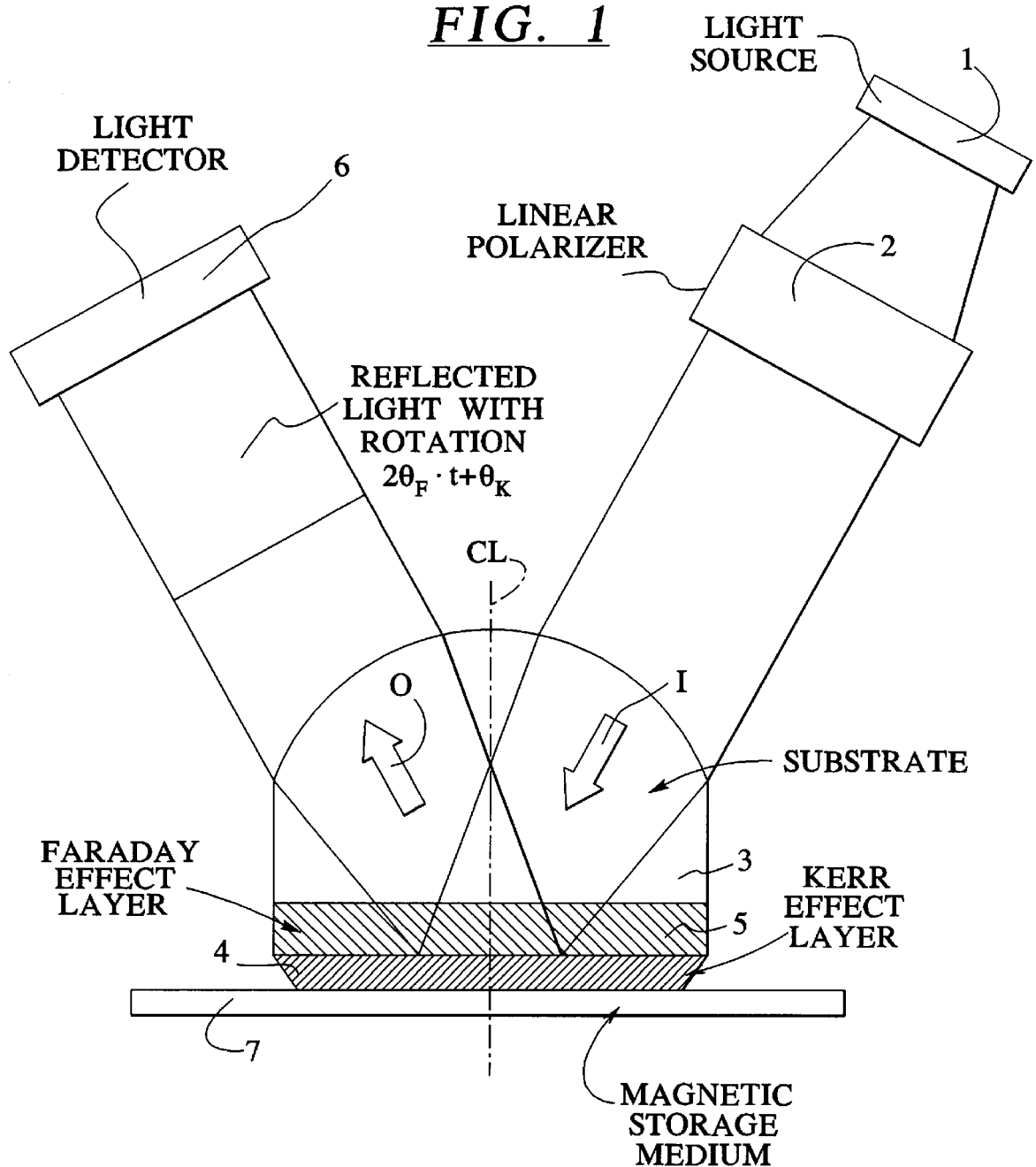
FIG. 1 is a schematic side view of a magneto-optical readout head constructed and operating in accordance with the principles of the present invention, shown in a usage environment including a magnetic storage medium, a light source and a light detector.

FIG. 1 shows a side view of a magneto-optical readout head constructed in accordance with the principles of the present invention. The readout head is used with a light source 1 which produces light which passes through a linear polarizer 2, and enters the magneto-optical readout head in the direction of arrow I (for incoming). Although the light source 1 and the linear polarizer 2 are shown in FIG. 1 as separate items, it will be understood by those of ordinary skill in optical technology that a light source 1 may be employed which inherently emits linearly polarized light, in which case the linear polarizer 2 will be embodied within the light source 1, rather than being a separate component.

The magneto-optical readout head according to the invention is formed by a substrate 3 into which the linearly polarized light is directed as shown in FIG. 1. The substrate 3 is composed of monocrystalline material, and preferably is a monocrystalline garnet material such as gadolinium gallium garnet (GGG), possibly containing scandium (GScGG), or a similar monocrystalline material with a high degree of transparency (high optical quality) and a high refractive index. If a GGG crystal is employed as the substrate 3, it may be of the type having the composition $X_3Y_5O_{12}$, wherein X is gadolinium or calcium or a mixture thereof, Y is gallium, magnesium or zirconium or a mixture thereof, and O is oxygen.

At a side of the substrate 3 oriented toward a magnetic storage medium 7, containing data to be readout, the substrate 3 has a Faraday effect layer 5 applied thereto, functioning as a Faraday rotator with a Faraday coefficient $\theta_F$. The Faraday effect layer 5 is optically transparent and preferably has a magnetic vector parallel to the surface of the substrate 3 to which it is applied, although this is not necessary. The Faraday effect layer 5 may, for example, be a ferrite-garnet film. The linearly polarized light proceeding into the substrate 3, and subsequently passing through the Faraday effect layer 5, is rotated (i.e., its polarization direction is rotated) dependent on the direction of any magnetic field which is present in the Faraday effect layer 5. The amount of rotation which occurs in the Faraday effect layer 5 is the product of the Faraday rotation coefficient $\theta_F$, and the thickness t of the Faraday effect layer 5.

The surface of the Faraday effect layer 5 facing toward the magnetic storage medium 7 is covered with an applied Kerr effect layer 4, which forms the exterior surface of the magneto-optical head proximate the magnetic storage medium 7. The Kerr effect layer 4 has a uniaxial magnetic property with a magnetic vector $\vec{M}$ perpendicular to the surface of the head, and thus also perpendicular to the surface of the magnetic storage medium 7 proximate thereto. The Kerr effect layer 4 has a Kerr rotation coefficient $\theta_K$ that is as high as possible, and a reflectivity coefficient R which is also as high as possible. This is desirable because the efficiency of the Kerr effect layer is $\theta_K \cdot \sqrt{R}$ when the Kerr effect is present. The linear polarized light which has past through the substrate 3 and which has been rotated by its passage through the Faraday effect layer 5 is thus additionally rotated upon reflection at the Kerr effect layer 4. The amount of rotation achieved by this reflection is dependent on the aforementioned efficiency, and the direction of any magnetic field which is present in the Kerr effect layer 4.

The Kerr effect layer 4 thus functions as a Kerr effect rotator, and can be formed, for example, by multiple layers of platinum and cobalt, or platinum-nickel and cobalt, with small coercivity, or mono-layers of GdFe or Gd Fe Co or similar uniaxial magnetic materials, including other Fe—Ni-based materials with small coercivity and a magnetic vector $\vec{M}$ oriented perpendicularly to the surface of the magnetic storage medium 7.

Some of the above compositions for the Kerr effect layer 4 have a higher efficiency for use with longitudinal recording storage media, others are more suited for perpendicular recording storage media.

After the light is reflected at the Kerr effect layer 4, it passes once again through the Faraday effect layer 5, and through the remainder of the substrate 3, and exits in the direction of the arrow O (for outgoing). The outgoing light thus exhibits a total polarization rotation of $2\theta_F \cdot t + \theta_K$. This outgoing light is incident on a light detector 6, which identifies the amount of polarization rotation. As described above, the rotation is dependent in part on the magnetic field which is present in the Faraday effect layer 5 and the Kerr effect layer 4. Therefore, data which is magnetically stored in the magnetic storage medium 7 has a direct effect on the amount of polarization rotation which will be exhibited by the outgoing light. The light detector 6, by identifying this polarization rotation, is thus able to readout the data stored in the magnetic storage medium 7. Since the amount of rotation is enhanced compared to known magneto-optical heads, the data identification can be conducted much more reliably, and allows data which is magnetically stored with ultra high density to be read. In order for $\theta_K$ to increase the total polarization, and thus achieve the aforementioned increased resolution, the wavelength of the illuminating light must be such that $\theta_K$ and $\theta_F$ have the same operational sign, so that $\theta_K$ increases, (positively adds to) the product $2\theta_F \cdot t$, rather than cancelling (negatively adds to) all or a portion thereof.

The side of the magneto-optical head facing toward the magnetic storage medium 7, composed of the Kerr effect layer 4, is inherently hard and durable, due to the nature of the aforementioned types of materials which can serve as the Kerr effect layer 4. Moreover, this side of the magneto-optical recording head facing toward the magnetic storage medium 7 is substantially planar. By contrast, the side of the magneto-optical head formed by the substrate 3, facing away from the magnetic storage medium 7, is provided with a shape, such as a convexity, for magnifying the image of the domain structures of the Kerr effect layer 4 and the Faraday effect layer 5, thereby further enhancing the ability of the light detector 6 to reliably identify the amount of polarization rotation. For this purpose, instead of monocrystalline garnet, the substrate 3 may be formed, for example, of high quality optical-grade glass.

Preferably the magneto-optical head is symmetrically constructed about a center line CL.

Figure 2:
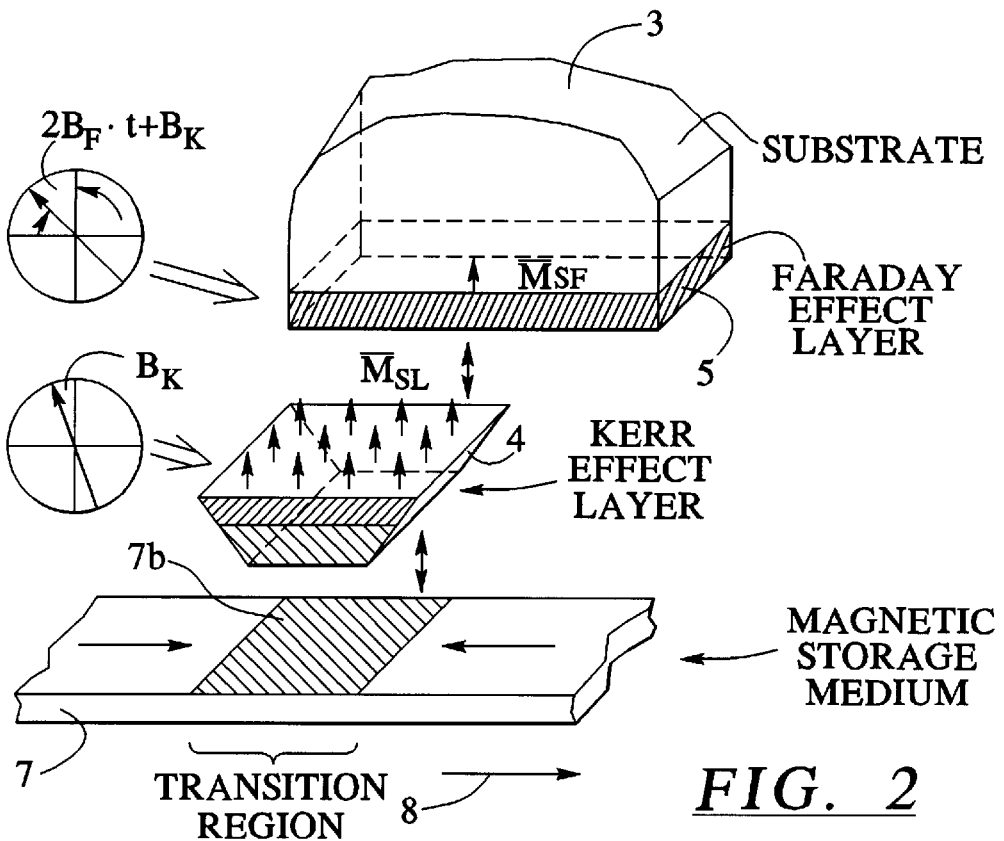
FIGS. 2 and 3 illustrate the operation of the magneto-optical readout head of FIG. 1, respectively upon encountering two different types of transition regions in the magnetic storage medium, with the magneto-optical head being shown in an exploded view for illustrative purposes.
Figure 3:
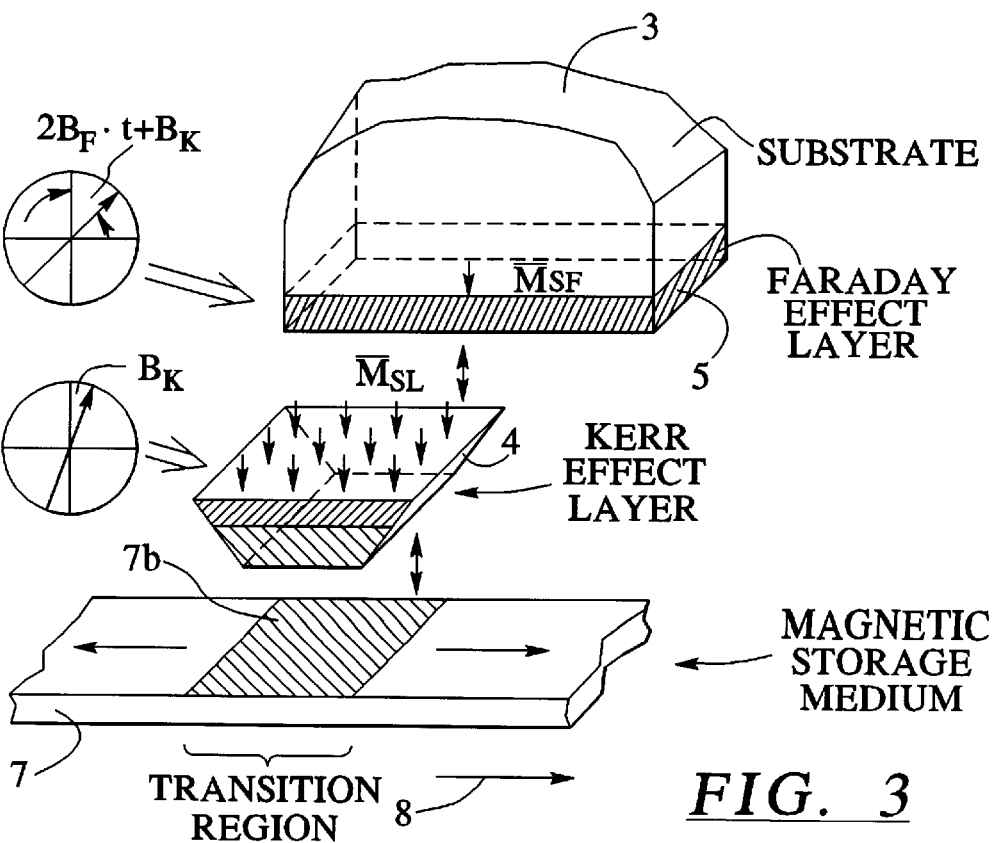

The operation of the magneto-optical head shown in FIG. 1 in the presence of two different types of transition regions 7a and 7b in the magnetic storage medium 7 is shown in FIGS. 2 and 3, respectively. In each of FIGS. 2 and 3, the magneto-optical head is shown in an exploded view with accompanying polar graphs. In each of FIGS. 2 and 3, the magnetic storage medium 7 is, for exemplary purposes, indicated as a magnetic tape moving in the direction of the arrow 8.

When the magneto-optical head encounters a transition region 7a for a track on the magnetic storage medium 7 as shown in FIG. 2, the magnetization vector $\vec{M}_{SL}$ of the Kerr effect layer 4 becomes oriented in a direction perpendicular to, and through the plane of, the Kerr effect layer 4. By contrast, when encountering a transition region 7b as shown in FIG. 3, the magnetization vector $\vec{M}_{SL}$ of the Kerr effect layer 4 becomes oriented in an opposite direction, but still perpendicular to the plane of the Kerr effect layer 4. The magnetization vector $\vec{M}_{SL}$ of the Faraday effect layer 5 is in both cases in the same direction as the magnetization vector $\vec{M}_{SL}$ of the Kerr effect layer 4. Therefore, when the magneto-optical head encounters each type of transition region 7a and 7b, the magnetization vectors $\vec{M}_{SL}$ and $\vec{M}_{SL}$ will add vectorially, with no cancellation, thereby enhancing the total polarization rotation of the outgoing light, as indicated by the polar graphs shown in FIGS. 2 and 3.

The outgoing light can be analyzed so that the maximum signal is obtained at the light detector 6 at the operating wavelength.

A magneto-optical readout head constructed in accordance with the principles of the present invention having a Faraday effect layer 5 composed of a ferrite-garnet film, and a Kerr effect layer 4 composed of a Pt/Co layer structure, exhibited a delay response in the presence of an external magnetic field pulse of not more than 300 picoseconds. This ensures that a transducer constructed in this manner is capable of resolving the real time magnetic field pattern associated with high frequency and ultra density magnetic recording.

The light source 1 in combination with the linear polarizer 2 can be formed by any suitable polarizing illumination source, such as a laser diode, or a monochromatic polarizing beam source, such as a polarized LCD. The light detector 6 is preferably matched in a suitable manner to the light source 1 and may be formed, for example, by a photodiode matrix, a CCD matrix, or the like.

As noted above, a ferrite-garnet film is suitable for use as the Faraday effect layer 5. Depending on the wavelength of the light source 1, however, other types of materials may be better suited, such as hexaferrite materials, or sphinel-ferrite films.

Although FIGS. 2 and 3 illustrate a tape as the magnetic storage medium 7, the magneto-optical head and readout technique described herein can be employed with any type of magnetic storage medium, and is not limited to tapes.

Although modifications and changes may be suggested by those of ordinary skill in the art, it is the intention of the inventor to embody within the patent warranted hereon all changes and modifications as reasonably and properly come within the scope of his contribution to the art.

I claim as my invention:

1. A magneto-optical readout head for reading magnetically stored data for use with a source of illuminating light having a wavelength, comprising:

an optically transparent substrate having a surface adapted to face a magnetic storage medium;

an optically transparent Faraday effect rotator, having a Faraday coefficient $\theta_F$, disposed on said surface of said substrate and having a Faraday effect rotator surface adapted to face said magnetic storage medium; and an optically reflective Kerr effect rotator, having a Kerr coefficient $\theta_K$, disposed on said Faraday rotator surface, with $\theta_F$ and $\theta_K$ having a same operational sign at said wavelength of said illuminating light.

2. A magneto-optical readout head as claimed in claim 1 wherein said Faraday rotator comprises a layer of material exhibiting the Faraday effect in a presence of a magnetic field.

3. A magneto-optical readout head as claimed in claim 1 wherein said Kerr rotator comprises a layer of material exhibiting the Kerr effect in a presence of a magnetic field.

4. A magneto-optical readout head as claimed in claim 1 wherein said Faraday rotator and said Kerr rotator have respective magnetic domain structures, and wherein said substrate has a shape at a side facing away from said surface of said substrate for magnifying said magnetic domain structures of said Faraday rotator and said Kerr rotator.

5. A magneto-optical readout head as claimed in claim 1 wherein said substrate is comprised of optical grade glass.

6. A magneto-optical readout head as claimed in claim 1 wherein said substrate is comprised of monocrystalline garnet.

7. A magneto-optical readout head as claimed in claim 6 wherein said substrate is comprised of gadolinium gallium garnet.

8. A magneto-optical readout head as claimed in claim 6 wherein said substrate is comprised of gadolinium gallium garnet containing scandium.

9. A magneto-optical readout head as claimed in claim 6 wherein said substrate is comprised of a material having a composition $X_3Y_5O_{12}$, wherein X comprises at least one element selected from the group consisting of gadolinium and calcium, wherein Y comprises at least one element selected from the group consisting of gallium, magnesium and zirconium, and wherein O is oxygen.

10. A magneto-optical readout head as claimed in claim 1 wherein said Faraday rotator is comprised of a ferrite-garnet film on said substrate surface.

11. A magneto-optical readout head as claimed in claim 1 wherein said Kerr rotator comprises a platinum-cobalt multi-layer structure.

12. A magneto-optical readout head as claimed in claim 1 wherein said Kerr rotator comprises a multi-layer platinum-nickel and cobalt structure.

13. A magneto-optical readout head as claimed in claim 1 wherein said Kerr rotator comprises a GdFe layer.

14. A magneto-optical readout head as claimed in claim 1 wherein said Kerr rotator comprises a GdFeCo layer.

15. A magneto-optical readout head as claimed in claim 1 wherein said Kerr rotator comprises a layer of an Fe—Ni based material having a small coercivity and a magnetization vector substantially perpendicular to said Faraday rotator surface.

16. A magneto-optical readout head as claimed in claim 1 wherein said Faraday rotator is comprised of a ferrite-garnet material.

17. A magneto-optical readout head as claimed in claim 1 wherein said Faraday rotatory is comprised of a hexaferrite material.

18. A magneto-optical readout head as claimed in claim 1 wherein said Faraday rotator comprises a sphinel ferrite film.

19. A method for making a magneto-optical readout head for reading magnetically stored data, using illuminating light having a wavelength comprising the steps of:

providing an optically transparent substrate having a surface adapted to face a magnetic storage medium;

applying an optically transparent Faraday effect rotator, having a Faraday coefficient $\theta_F$ on said surface of said substrate, having a Faraday effect rotator surface adapted to face said magnetic storage medium; and applying an optically reflective Kerr effect rotator, having a Kerr coefficient $\theta_K$ on said Faraday rotator surface, with $\theta_F$ and $\theta_K$ having a same operational sign at said wavelength of said illuminating light.

20. A method as claimed in claim 19 comprising applying as said Faraday rotator a layer of material exhibiting the Faraday effect in a presence of a magnetic field.

21. A method as claimed in claim 19 comprising applying as said Kerr rotator a layer of material exhibiting the Kerr effect in a presence of a magnetic field.

22. A method as claimed in claim 19 wherein said Faraday rotator and said Kerr rotator have respective magnetic domain structures, and comprising providing said substrate with a shape at a side facing away from said surface of said substrate for magnifying said magnetic domain structures of said Faraday rotator and said Kerr rotator.

23. A method as claimed in claim 19 comprising providing a substrate comprised of optical grade glass as said substrate.

24. A method as claimed in claim 19 comprising providing a substrate comprised of monocrystalline garnet as said substrate.

25. A method as claimed in claim 24 comprising providing a substrate comprised of gadolinium gallium garnet as said substrate.

26. A method as claimed in claim 24 comprising providing a substrate comprised of gadolinium gallium garnet containing scandium as said substrate.

27. A method as claimed in claim 24 comprising providing a substrate comprised of a material having a composition $X_3Y_5O_{12}$ as said substrate, wherein X comprises at least one element selected from the group consisting of gadolinium and calcium, wherein Y comprises at least one element selected from the group consisting of gallium, magnesium and zirconium, and wherein O is oxygen.

28. A method as claimed in claim 19 comprising applying a ferrite-garnet film on said substrate surface as said Faraday rotator.

29. A method as claimed in claim 19 comprising applying a platinum-cobalt multi-layer structure on said Faraday rotator surface as said Kerr rotator.

30. A method as claimed in claim 19 comprising applying a multi-layer platinum-nickel and cobalt structure on said Faraday rotator surface as said Kerr rotator.

31. A method as claimed in claim 19 comprising applying a GdFe layer on said Faraday rotator surface as said Kerr rotator.

32. A method as claimed in claim 19 comprising applying a GdFeCo layer on said Faraday rotator surface as said Kerr rotator.

33. A method as claimed in claim 19 comprising applying a layer of an Fe—Ni based material, having a small coercivity and a magnetization vector substantially perpendicular to said Faraday rotator surface, on said Faraday rotator surface as said Kerr rotator.

34. A method as claimed in claim 19 comprising applying a ferrite-garnet material on said substrate surface as said Faraday rotator.

35. A method as claimed in claim 19 comprising applying a hexaferrite material on said substrate surface as said Faraday rotator.

36. A method as claimed in claim 19 comprising applying a sphinel ferrite film on said substrate surface as said Faraday rotator.

37. A method for reading out magnetically stored data from a magnetic storage medium comprising the steps of:

disposing an optically transparent Faraday rotator, having a Faraday coefficient $\theta_F$, and an optically reflecting Kerr rotator, having a Kerr coefficient $\theta_K$, in succession above said magnetic storage medium, with said Kerr rotator disposed between said Faraday rotator and said magnetic storage medium, said magnetic storage medium containing magnetically stored data which produces a magnetic field in each of said Kerr rotator and said Faraday rotator, with $\theta_F$ and $\theta_K$ having a same operational sign at a wavelength;

directing linearly polarized light, having said wavelength and having a polarization vector, through said Faraday rotator and reflecting said linearly polarized light at said Kerr rotator back through said Faraday rotator to produce polarized light with said polarization vector rotated by a rotation angle having a magnitude dependent on said magnetic field in said Faraday rotator and said Kerr rotator; and detecting and analyzing said polarized light with said polarization vector rotated by said rotation angle and reading out said magnetically stored data by monitoring the magnitude of said rotation angle.

38. A method as claimed in claim 37 wherein the step of producing said polarized light with said polarization vector rotated by a rotation angle comprises producing polarized light with said polarization vector rotated by a rotation angle of substantially 4°.

39. A method as claimed in claim 37 wherein said Faraday rotator and said Kerr rotator respectively exhibit domain structures, and comprising the additional step of passing said polarized light with said polarization vector rotated by a rotation angle through a structure for magnifying said domain structures of said Faraday rotator and said Kerr rotator.

40. A method as claimed in claim 39 comprising the additional step of joining said structure for magnifying said domain structures, said Faraday rotator and said Kerr rotator in a unitary magneto-optical head.

41. A method as claimed in claim 37 comprising the additional step of joining said Faraday rotator and said Kerr rotator in a unitary magneto-optical head.

\* \* \* \* \*

(12) EX PARTE REEXAMINATION CERTIFICATE (5189th)
United States Patent
Il'Yashenko

(10) Number: US 5,920,538 C1
(45) Certificate Issued: Aug. 23, 2005

(54) MAGNETO-OPTICAL READOUT METHOD AND MAGNETO-OPTICAL READOUT HEAD AND METHOD FOR MAKING SAME

(75) Inventor: Eugene Il'Yashenko, Moscow (RU)

(73) Assignee: Tandberg Data ASA, Oslo (NO)

Reexamination Request:
No. 90/005,916, Jan. 26, 2001

Reexamination Certificate for:
Patent No.: 5,920,538
Issued: Jul. 6, 1999
Appl. No.: 09/096,257
Filed: Jun. 11, 1998

(51) Int. Cl.$^7$ .................................................. G11B 7/00
(52) U.S. Cl. ........................... 369/110.04; 369/112.02; 369/112.17; 369/13.32
(58) Field of Search ....................... 369/110.01, 110.02, 369/110.04, 112.16, 112.17, 112.19, 112.2, 112.21, 112.23, 112.28, 13.29, 13.3, 13.31, 13.32

(56) References Cited

U.S. PATENT DOCUMENTS

| | | | |
|---|---|---|---|
| 3,474,428 A | | 10/1969 | Nelson et al. |
| 4,202,022 A | | 5/1980 | Imamura et al. |
| 5,689,391 A | | 11/1997 | Maurice |
| 6,044,045 A | * | 3/2000 | IL"Yashenko et al. ........ 369/14 |

FOREIGN PATENT DOCUMENTS

| | | |
|---|---|---|
| EP | 0 472 188 | 2/1992 |
| FR | 2 569 072 | 5/1984 |
| GB | 2 210 001 | 11/1983 |

OTHER PUBLICATIONS

700 IBM Technical Disclosure Bulletin—Optical Transducer System—Alstad et al, vol. 11, No. 10 Mar. 1969.
Patent Abstracts of Japan—62075955—Jul. 4, 1987.

* cited by examiner

*Primary Examiner*—Thang V. Tran

(57) ABSTRACT

A magneto-optical readout head for reading out magnetically stored data has a high optical quality substrate and a transducer applied to the substrate formed by a Faraday rotator and a Kerr rotator, with the Kerr rotator facing the magnetic storage medium. The substrate can be provided with a shape for magnifying the domain structures of the Kerr rotator and the Faraday rotator. Linearly polarized light is passed through the substrate and the polarization vector thereof is rotated by the Faraday rotator upon passage through the Faraday rotator and the light is reflected at the Kerr rotator, and is provided with an additional rotation upon reflection. Upon passing back through the Faraday rotator, the polarization vector of the polarized light is further rotated, so that the emerging light has a polarization vector which has been rotated by twice the Faraday coefficient of the Faraday rotator times the thickness of the Faraday rotator, plus the Kerr rotation coefficient of the Kerr rotator positively added thereto. The light emerging from the magneto-optical readout head is analyzed as to the amount of rotation of the polarization vector, thereby identifying the readout data. Because the amount of rotation of the polarization vector is enhanced by the Faraday rotator in combination with the Kerr rotator, magneto-optical readout of the real-time magnetic field pattern associated with high frequency and ultra high density recording is reliably achieved.

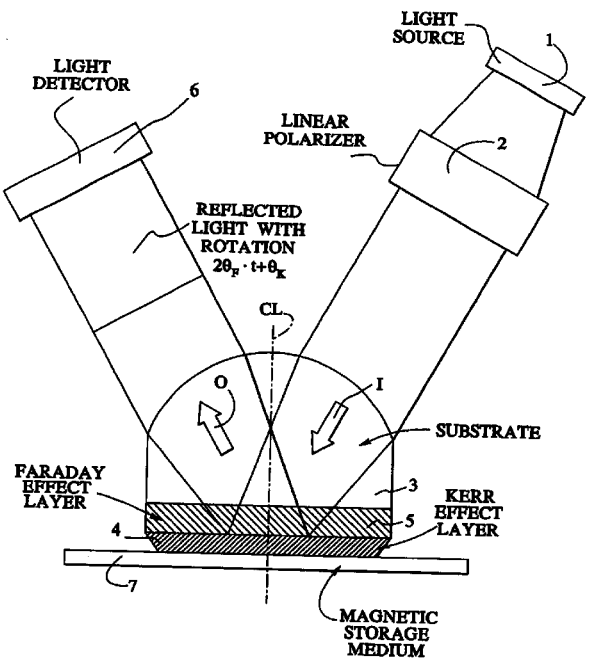

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–37 and 39–41 are cancelled.

Claim 38 is determined to be patentable as amended.

38. [A method as claimed in claim 37] *A method for reading out magnetically stored data from a magnetic storage medium comprising the steps of:*

*disposing an optically transparent Faraday rotator, having a magnetic domain structure and a Faraday coefficient $\theta_F$, and an optically reflecting Kerr rotator, having a magnetic domain structure and a Kerr coefficient $\theta_K$, in succession above said magnetic storage medium, with said Kerr rotator disposed between said Faraday rotator and said magnetic storage medium, said magnetic storage medium containing magnetically stored data which produces a magnetic field in each of said Kerr rotator and said Faraday rotator, with $\theta_F$ and $\theta_K$ having a same operational sign at a wavelength;*

*directing linearly polarized light, having said wavelength and having a polarization vector, through said Faraday rotator and reflecting said linearly polarized light at said Kerr rotator back through said Faraday rotator to produce polarized light with said polarization vector rotated by a rotation angle having a magnitude dependent on said magnetic field in said Faraday rotator and said Kerr rotator;*

*detecting and analyzing said polarized light with said polarization vector rotated by said rotation angle and reading out said magnetically stored data by monitoring the magnitude of said rotation angle; and*

*providing a substrate with a shape at a side facing away from a surface of said substrate for magnifying the respective magnetic domain structures of said Faraday rotator and said Kerr rotator,* wherein the step of producing said polarized light with said polarization vector rotated by a rotation angle comprises producing polarized light with said polarization vector rotated by a rotation angle of substantially 4°.

* * * * *